Patented May 20, 1941

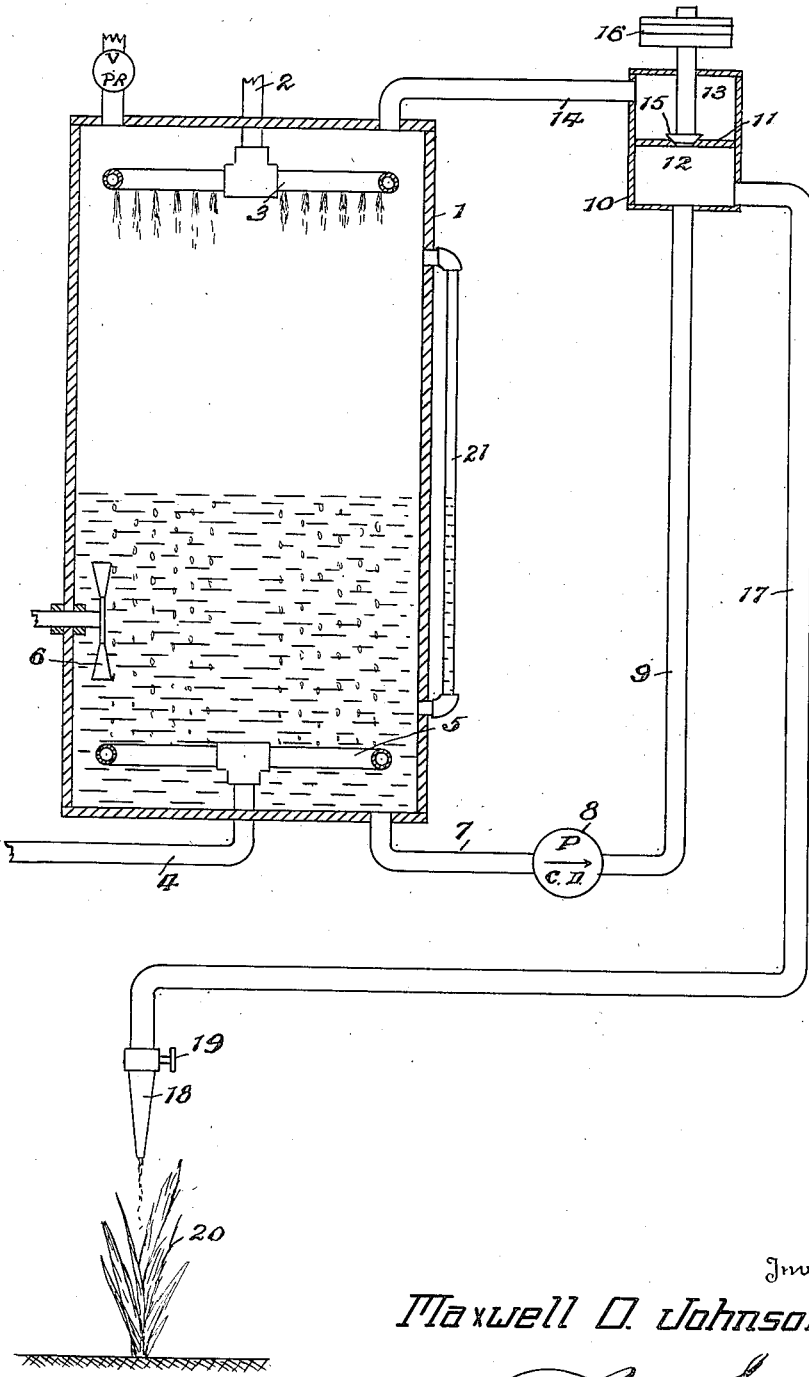

2,242,429

UNITED STATES PATENT OFFICE 2,242,429

PLANT TREATMENT

Maxwell O. Johnson, Wahiawa, Territory of Hawaii, assignor to California Packing Corporation, a corporation of New York Application July 27, 1937, Serial No. 156,019

7 Claims. (Cl. 47—58)

This invention is directed to the treatment of plants to expedite the formation or development of buds thereon, and is directed to the process, solution and apparatus for carrying out the treatment.

The invention will be described more particularly in the treatment of pineapple plants, the process of the growth and development of which may be briefly described as follows: New plantings are usually made in the autumn. These plantings usually start their process of inflorescence or flower bud development in December of the following year; the small flower heads emerge in the next February or March and the fruit ripens about July of the following year. Thus, under natural conditions, nearly twenty-three months are required after planting before harvesting, and obviously the harvesting period is concentrated in a few weeks. Some plants fail to blossom at the normal time and another practically full year is required before flower bud development.

It is the primary object of the present invention to treat the plants so that they may be forced to blossom at the normal period or so that blossoming of any or all plants may be prematurely forced at any desired time, thus tending to spread the harvesting of the crop over a longer period.

Pineapples have a second growth and this second growth usually ripens in the summer, a year after the first crop, on branches or offshoots of the main stem, these branches or offshoots being commonly called suckers. Under normal conditions, many such suckers, often over 40% of the same, may fail to blossom for the second crop. Even under these conditions, such suckers may, if undamaged, blossom for the third crop the next year, but this third crop is usually small by reason of the fact that the suckers are usually so injured or broken during the harvesting of the second crop, or suffer such deterioration under insect attacks, that fruit development never occurs.

It is a further object of the present invention to utilize the treatment so that the process of flower bud formation may be forced in practically all of the suckers for the second crop, thus materially increasing the yield over normal conditions.

It has been heretofore known to subject the pineapple plant to low concentrations of ethylene, acetylene, or similar unsaturated hydrocarbon gases, but such treatment is difficult and expensive from a commercial standpoint. The application of water saturated with acetylene provides a cheaper and more convenient process, but in order to be effective, repeated applications are necessary to secure the desired results.

In carrying out the process of the present improvement, it has been proven that the addition of a substance to increase the viscosity or surface tension of the water materially increases the effectiveness of the solution in expediting bud formation. To this end, a dilute oil emulsion containing approximately .75 gallons of oil per 100 gallons of water, with the emulsifier a colloidal earth, when saturated with acetylene, secures a decided and material improvement so far as the treatment is concerned.

Furthermore, as an important detail of the present invention, it has been found that the use of ethylene in place of acetylene in the oil emulsion vehicle produces a materially increased result over the acetylene composition. For example, in numerous tests, where treated beds of plants were compared with untreated beds, it was noted that the untreated beds yielded at the rate of 22.7 tons of pineapple fruit per net acre on the second crop. The treated beds, with one application of acetylene and water, averaged 26.4 tons per acre, while two applications of the solution resulted in an average of 28.3 tons per acre. A single application of acetylene in oil emulsion averaged 29.4 tons per acre while two treatments of acetylene in oil emulsion averaged 30.5 tons per acre.

Where the solution was oil emulsion saturated with ethylene, tests with one application on plants about nine months old showed the resulting percentage of plants blossoming in the untreated beds was .75, for ethylene in water 82.2%, and for ethylene in oil emulsion 90%.

The oil emulsion may be any oil suitable for application on plants though the use of refined mineral oil is preferred. For example, various mineral oils, of which Diesel oil or the more highly refined heavier spray oils may be mentioned as an example, can be used. Various emulsifiers may be employed, such for example as colloidal earths, as clay, fuller's earth and bentonite, provide suitable and inexpensive emulsions. An effective concentrated emulsion may be made by mixing one pound of bentonite, two gallons of mineral oil and one gallon of water, with the mixture agitated to form an emulsion. .5 to 24 pounds of a colloidal earth may be used per gallon of water and .15 to three gallons of water per gallon of oil. This concentrated oil emulsion is added to water to give a dilute oil emulsion. For example, about .75% oil in the dilute oil emulsion may be provided for good results though an increase in the oil content may be slightly more effective.

It is also advantageous to secure quick saturation of the oil emulsion and it has been found effective for this purpose to provide the mixture with agitation under pressures of the acetylene or ethylene slightly higher than atmospheric pressure. In using the solution, about 1.5 gallons per one hundred plants or suckers is efficient though this may be varied according to conditions. The solution should be supplied to the plant near the growing point with as little agitation as possible in order to avoid increased tendency of the gas to escape.

The use of the oil emulsion as a vehicle has another decided advantage. For many years a large proportion of the lands in Hawaii, which were otherwise suitable for pineapple cultivation, produced yellow, stunted plants and but little fruit. Following investigation, this was attributed to the poisoning of the plants by the large quantities of manganese in the soil. A solution of iron salts for application to the pineapple plants, an inventive product of the applicant, appeared to neutralize this manganese poisoning and hence it is a development of the present invention that solutions of iron salts saturated with acetylene, ethylene, or similar gases not only counteracts the manganese poisoning but materially promotes bud formation. The iron sulfate solution was made by the addition of 3 pounds of ordinary green crystals of ferrous sulfate with 7 molecules of water of crystallization to 100 gallons of water.

I have discovered that the addition of substances to increase the viscosity or surface tension of the water increases considerably the effectiveness of water solutions of acetylene in expediting bud formation. For example, on August 13th and August 20, separate trials were made on growing pineapple plants in the field which plants were about 10 months old. The solutions of acetylene were most advantageously applied in the heart of the individual plant at or near its growing point. The liquids applied had all been saturated equally with acetylene and single applications were made at the same advantageous rate of 1.5 gallons per 100 plants and in each trial at approximately the same time. By October 3rd, blossoms had begun to appear on the treated plants. By November 19th, weekly counts of blossoms showed little progressive increase. The count on November 19th showed as the average for the two trials that check beds (untreated) had .75% of the plants blossoming, and the beds treated with water saturated with acetylene, had 38.375% blossoming. Where soap was added to the water at the rate of 13 ounces per 100 gallons and the solution then saturated with acetylene, the blossoming increased to 65.75%. A solution of commercial blood albumen spreader at the same concentration and saturated with acetylene gave 58% blossoming. Colloidal earth or clay added to water at the same rate and saturated with acetylene gave 51.25% blossoming.

The invention contemplates an apparatus for the making up of the solution and for use in applying the solution to the plants. This is illustrated more or less diagrammatically in the figure of the accompanying drawing.

In this drawing there is shown a saturation tank 1 which is closed and preferably of metal. The liquid to be saturated is delivered to the tank through a supply pipe 2 and delivered to the interior of the tank through the conventional sprinkling element 3 located approximately at the upper end of the tank. Any conventional or appropriate float control means, not necessary to illustrate, is to be provided to maintain a normal level of liquid in the tank. Preferably this level will be approximately one-half or less of the height of the tank, so that the level of the liquid is at an appreciable and sufficient distance from the sprinkling element 3.

The gas, such as acetylene, ethylene, or similar gas, enters the tank through a supply pipe 4 and is delivered through a discharge element 5 located within the tank near the bottom thereof, so that the gas, which of course is under sufficient pressure for the purpose, bubbles up through and charges the liquid. The gas rising free of the liquid into the upper portion of the tank will obviously tend to charge to some extent the liquid falling from the spray element 3. While the fall of this liquid may cause sufficient agitation in the main body of liquid, it is preferred to provide a conventional agitator 6 located within the body of the liquid in the lower portion of the tank and suitably operated to provide necessary agitation of said liquid.

The gas-saturated liquid or emulsion is delivered from the bottom of the tank through a pipe 7 to a pump, shown conventionally at 8, the pressure or outlet side of the pump communicating through a pipe 9 to a pressure regulator 10. The pump may be manually controlled in order to insure desired delivery. In order to afford continuous operation of the pump, the pressure regulator 10 is preferable. The pressure regulator is divided by a partition 11 into a lower chamber 12 in open communication with the pipe 9 and an upper chamber 13 in open communication through a pipe 14 with the upper end of the tank 1.

A valve 15 provides for the escape of liquid under pressure in excess of that necessary for delivery with such liquid obviously returning to the tank. The valve 15 may be loaded by weights 16 which may be used in sufficient number to insure that the pressure in the chamber 12 is sufficient for delivery purposes. A delivery pipe 17 is in open communication with the chamber 12 and terminates in an outlet 18 controlled by a manually operable valve 19 for direct delivery of the charged liquid to the plant, indicated at 20.

The saturated liquid is drawn from the saturating chamber or tank through pipe 7 to the pump and delivered by the pump to the plant. A glass gauge 21, with the respective ends communicating with the respective spaces in the saturation chamber or tank, may be used and, if desired, a float valve may be employed to cut off delivery from the tank to the pump through the pipe 7 in the event the liquid level in the saturation chamber falls too low.

The apparatus described is of particular advantage in the treatment by the present process as it provides a simple means for charging the oil emulsion vehicle and creating a pressure in the charged vehicle to insure appropriate delivery to the plants. The rate and quantity of the delivery is, of course, controlled by the manually operable valve 19; the pressure of delivery by the adjustable weight valve 15; and the relief of excess pressure of delivery is taken care of by permitting the relief valve to open and permit the charged vehicle to return to the saturation chamber or tank.

While the process herein described is of particular importance in connection with the treatment of pineapple plants, it is to be understood that the invention, in whole or in part, is contemplated for use in expediting the formation or development of buds in any and all plant life which may respond to such treatment.

In pineapple and other plants free from insects, it may be possible to get efficiencies in forcing blossoming approaching or even exceeding those of the oil emulsion by adding colloidal earths, soap, blood albumen (or other substances increasing the viscosity or surface tension) to water before saturating with acetylene or ethylene.

What is claimed to be new is:

1. The process of treating plants to expedite bud formation consisting in applying to the growing plants in the field an unsaturated hydrocarbon gas in solution in an oil emulsion of water, oil and colloidal earth.

2. The process of treating plants to expedite bud formation consisting in applying to the growing plants in the field a water solution of an unsaturated hydrocarbon gas with the addition of iron salts.

3. The process of treating plants to expedite bud formation consisting in applying to the growing plants in the field a water solution of ethylene with the addition of iron salts.

4. As a new article of manufacture, a material for forcing bud formation or development in plants comprising a gaseous stimulant to bud formation or development absorbed in a mixture of a colloidal clay-like substance and a liquid.

5. As a new article of manufacture, a material for expediting the formation or development of buds on plants comprising a liquid carrying medium, bentonite and an unsaturated hydrocarbon selected from the group consisting of acetylene and ethylene.

6. The treatment of pineapple plants to expedite the development of buds and the formation of fruit thereon, which comprises applying to said plants a gaseous stimulation to bud formation or development absorbed in a mixture of a colloidal clay-like substance and a liquid.

7. The treatment of pineapple plants to expedite the development of buds and the formation of fruit thereon, which comprises applying to said plants a liquid carrying medium, bentonite, and an unsaturated hydrocarbon selected from the group consisting of acetylene and ethylene.

MAXWELL O. JOHNSON.